US010854251B2

(12) United States Patent
Yang et al.

(10) Patent No.: US 10,854,251 B2
(45) Date of Patent: Dec. 1, 2020

(54) PHYSICAL IDENTIFIERS FOR AUTHENTICATING AN IDENTITY OF A SEMICONDUCTOR COMPONENT

(71) Applicant: Google LLC, Mountain View, CA (US)

(72) Inventors: Andy Yang, Cupertino, CA (US); Scott D. Johnson, Cupertino, CA (US); Lynn Bos, Sunnyvale, CA (US); Neal Mueller, San Francisco, CA (US)

(73) Assignee: Google LLC, Mountain View, CA (US)

( * ) Notice: Subject to any disclaimer, the term of this patent is extended or adjusted under 35 U.S.C. 154(b) by 257 days.

(21) Appl. No.: 15/844,118

(22) Filed: Dec. 15, 2017

(65) Prior Publication Data

US 2019/0189171 A1    Jun. 20, 2019

(51) Int. Cl.
| | | |
|---|---|---|
| G06F 17/50 | (2006.01) |
| G11C 8/20 | (2006.01) |
| H04L 29/06 | (2006.01) |
| G06F 21/44 | (2013.01) |
| G06K 9/00 | (2006.01) |
| G11C 7/24 | (2006.01) |
| G06F 21/71 | (2013.01) |

(52) U.S. Cl.
CPC ............ G11C 8/20 (2013.01); G06F 21/44 (2013.01); G06K 9/00577 (2013.01); G11C 7/24 (2013.01); H04L 63/0876 (2013.01); H04L 63/0892 (2013.01); G06F 21/71 (2013.01)

(58) Field of Classification Search
USPC .................................. 716/51, 52, 53, 54, 55
See application file for complete search history.

(56) References Cited

U.S. PATENT DOCUMENTS

| | | | |
|---|---|---|---|
| 5,101,184 A * | 3/1992 | Antes ...................... G03H 1/30 |
| | | | 235/454 |
| 6,584,214 B1 | 6/2003 | Pappu et al. | |
| 6,834,251 B1 * | 12/2004 | Fletcher ................. G01V 15/00 |
| | | | 314/5 |
| 6,998,688 B2 | 2/2006 | De Jongh et al. | |
| 7,840,803 B2 | 11/2010 | Devadas et al. | |
| 8,321,350 B2 | 11/2012 | Durst | |
| 8,705,873 B2 | 4/2014 | Voloshynovskiy et al. | |
| 8,900,703 B1 | 12/2014 | Thommana et al. | |
| 8,950,662 B2 * | 2/2015 | Soborski ................ B42D 25/30 |
| | | | 235/375 |

(Continued)

FOREIGN PATENT DOCUMENTS

| | | |
|---|---|---|
| WO | 2011077459 | 6/2011 |
| WO | 2015185155 | 12/2015 |

OTHER PUBLICATIONS

"International Search Report and Written Opinion", PCT Application No. PCT/US2018/065427, dated Mar. 1, 2019, 15 pages.

(Continued)

*Primary Examiner* — Brian Ngo
(74) *Attorney, Agent, or Firm* — Colby Nipper PLLC

(57) ABSTRACT

This document describes techniques for authenticating an identity of a semiconductor component using a physical identifier. In some aspects, a physical identifier comprised of a region of features located indiscriminately within a surface of an encapsulated semiconductor component is fabricated. The physical identifier is then mapped. The map is then stored for use when authenticating the identity of the semiconductor component.

20 Claims, 9 Drawing Sheets

(56) References Cited

U.S. PATENT DOCUMENTS

| | | | |
|---|---|---|---|
| 9,940,572 B2* | 4/2018 | Soborski | G06K 19/10 |
| 2004/0026788 A1* | 2/2004 | Kim | H01L 22/34 |
| | | | 257/774 |
| 2006/0187719 A1 | 8/2006 | Matsumoto et al. | |
| 2011/0312841 A1* | 12/2011 | Silverbrook | B01L 3/5027 |
| | | | 506/40 |
| 2016/0321473 A1* | 11/2016 | Decoux | G06K 19/06037 |
| 2016/0373256 A1* | 12/2016 | Han | H01L 27/283 |
| 2018/0357475 A1* | 12/2018 | Honda | G06K 9/00604 |

OTHER PUBLICATIONS

"International Preliminary Report on Patentability", PCT Application No. PCT/US2018/065427, Jun. 25, 2020, 10 pages.

* cited by examiner

PHYSICAL IDENTIFIERS FOR AUTHENTICATING AN IDENTITY OF A SEMICONDUCTOR COMPONENT

BACKGROUND

Semiconductor components traditionally rely on integrated circuitry to communicate and process binary data for an operation, which often requires a level of security assurance. For example, trusted platform modules (TPMs) rely on integrated circuitry of a cryptoprocessor to generate and decipher security keys. By so doing, data is protected from cyber-attacks, such as data stored on servers or communicated via network cards. As another example, data authentication is conventionally performed by microprocessor integrated circuitry in consumer hardware, such as personal computers, to protect a user's identity and privacy. And, as yet another example, integrated circuitry included in a semiconductor component, such as a Radio-Frequency Identifier (RFID) transmitter embedded in an identification badge, may control access to a physical area. In these examples, if the integrated circuitry is part of an impostor semiconductor component (e.g., a semiconductor component that has been substituted into a system with fraudulent intent), security may be compromised. In short, authenticating an identity of a semiconductor component bears a direct impact on data security.

Conventional technologies often identify a semiconductor component by electrically reading a binary (e.g., digital) identifier stored in integrated circuitry of the semiconductor component. As attackers are capable of hacking, or falsifying, the binary identifier, authenticating the identity of the semiconductor component using only the binary identifier introduces an unacceptable level of risk.

SUMMARY

Fabricating a region having features located indiscriminately within a surface of an encapsulated semiconductor component is described. The region serves as a physical identifier, which is then mapped. The map is then stored for use when authenticating the identity of the semiconductor component.

Techniques for manufacturing a physical identifier as part of a surface of a semiconductor component to authenticate the semiconductor component's identity are described. One described method includes, as part of manufacturing the semiconductor component, fabricating, as a physical identifier, a region having features located indiscriminately within the surface of the semiconductor component; mapping the physical identifier; reading a binary identifier; and, storing the map and the binary identifier. Another described method includes mapping a physical identifier, the map a first map representing a region of a surface of a semiconductor component having features located indiscriminately within the surface; reading a binary identifier; retrieving a second map based on the read binary identifier; and, authenticating an identity of the semiconductor component based on comparing the first map and the second map. Types of semiconductor components including a physical identifier and a binary identifier are also described.

The described methods and aspects of the semiconductor component may apply to any point of a semiconductor component's life cycle where an enhanced security is desired. This includes during manufacture of the semiconductor component, during integration of the semiconductor component into a system, or during use of the semiconductor component in the field.

The details of one or more aspects are set forth in the accompanying drawings, which are given by way of illustration only, and in the description below. Other features, aspects, and advantages will become apparent from the description, the drawings, and the claims.

BRIEF DESCRIPTION OF THE DRAWINGS

The details of one or more aspects of physical identifiers for authenticating an identity of a semiconductor component are described below. The use of the same reference numbers in different instances in the description and the figures may indicate like elements.

DETAILED DESCRIPTION

Humans have unique physical identifiers that can be applied, as part of an authentication technique, to enhance levels of security assurance when identifying the person. For example, a border guard or security officer can utilize a physical identifier of a person (such as the fingerprint or iris pattern) in combination with a non-physical identifier (such as information contained in a passport) for verification, enhancing the level of security assurance that the person is who he claims to be.

Associating, as part of an authentication technique, a map representing a region of a semiconductor component with a binary identifier of the semiconductor component can yield similar enhanced levels of security. This enhanced level of security for identifying the semiconductor component may be realized in multiple domains, including during manufacture of the semiconductor component, during integration of the semiconductor component into a system, or during use of the semiconductor component in the field.

The present disclosure describes aspects of physical identifiers of a semiconductor component being used as part of a semiconductor component authentication technique. For example, a physical identifier may be mapped, relying on regions of morphology, microridges, magnetic nanoparticles, quantum dots, or optical nanoparticles that are fabricated into the surface of a semiconductor component. Alternatively, maps may be created from physical identifiers that are in the form of painted or etched regions of the surface of the semiconductor component The following discussion describes an operating environment and techniques that may be used to manufacture physical identifiers for a semiconductor component. Also, presented are techniques that may use maps of the physical identifier as part of a semiconductor component identity-authentication process, as well as types of semiconductor components that may use the physical identifier.

Operating Environment

Figure 1:
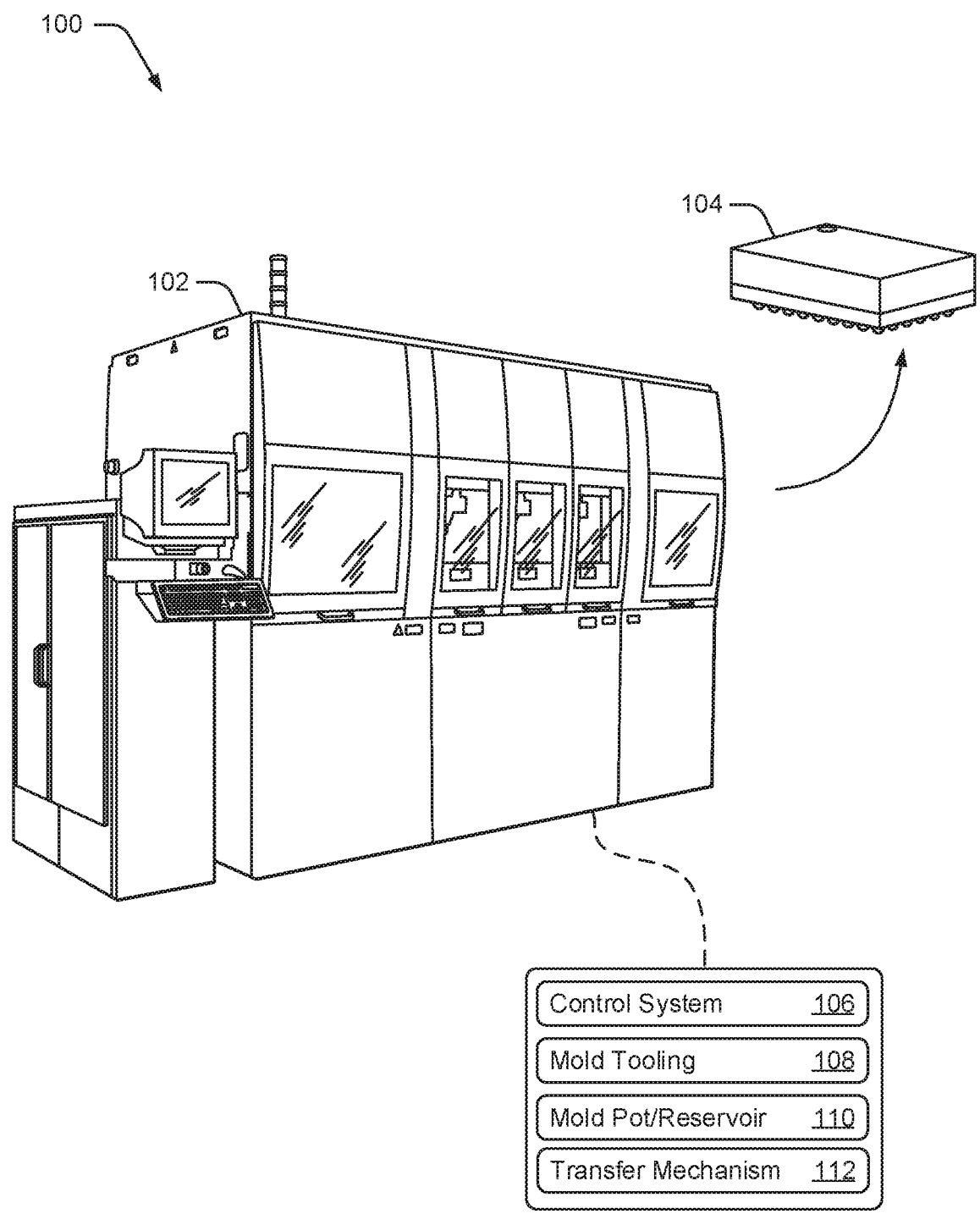
FIG. 1 illustrates an example environment that includes a molding system used to encapsulate an integrated circuit (IC) die to form a semiconductor component.

FIG. 1 illustrates an example operating environment 100, which includes an example molding system 102 used for encapsulating an integrated circuit (IC) die to form a semiconductor component 104. The molding system 102 utilizes a control system 106 to manage key components of the molding system 102, which are used as part of the encapsulation process, inclusive of mold tooling 108, a mold pot/reservoir 110, and a transfer mechanism 112.

The mold tooling 108 is customized for a particular configuration of semiconductor component 104. The customization of the mold tooling includes cavities that take into account factors such as sizes of IC die to be encapsulated, a mold compound used to encapsulate the IC die, a substrate to which the IC die may be attached, a desired granularity of a surface of the semiconductor component 104 after encapsulation, and so forth. The mold tooling 108 also includes fixturing to position a substrate to which the IC die are attached or mounted.

The mold pot/reservoir 110 holds mold compound prior to the mold compound being encapsulated around the IC die. The mold pot/reservoir 110 may include heating elements to liquify a mold compound prior to the mold compound encapsulating the IC die. The mold pot/reservoir 110 may also be segmented so that curing compounds (used to cure the mold compound) are maintained separate from the mold compound.

The transfer mechanism 112 transfers mold compound from the mold pot/reservoir 110 into cavities of the mold tooling 108. After transfer of the mold compound into the cavities of the mold tooling 108, curing of the mold compound may be influenced by additional thermal mechanisms available to the molding system 102.

Variations are applied to operations within the operating environment 100, including varying mold materials that encapsulate the IC die via the molding system 102, to form a region of a surface of the semiconductor component 104 that has features that are indiscriminate in terms location or size within the surface. The features can be used to support authenticating an identity of the semiconductor component 104.

Techniques Using a Physical Identifier for Authenticating Identity

Figure 2:
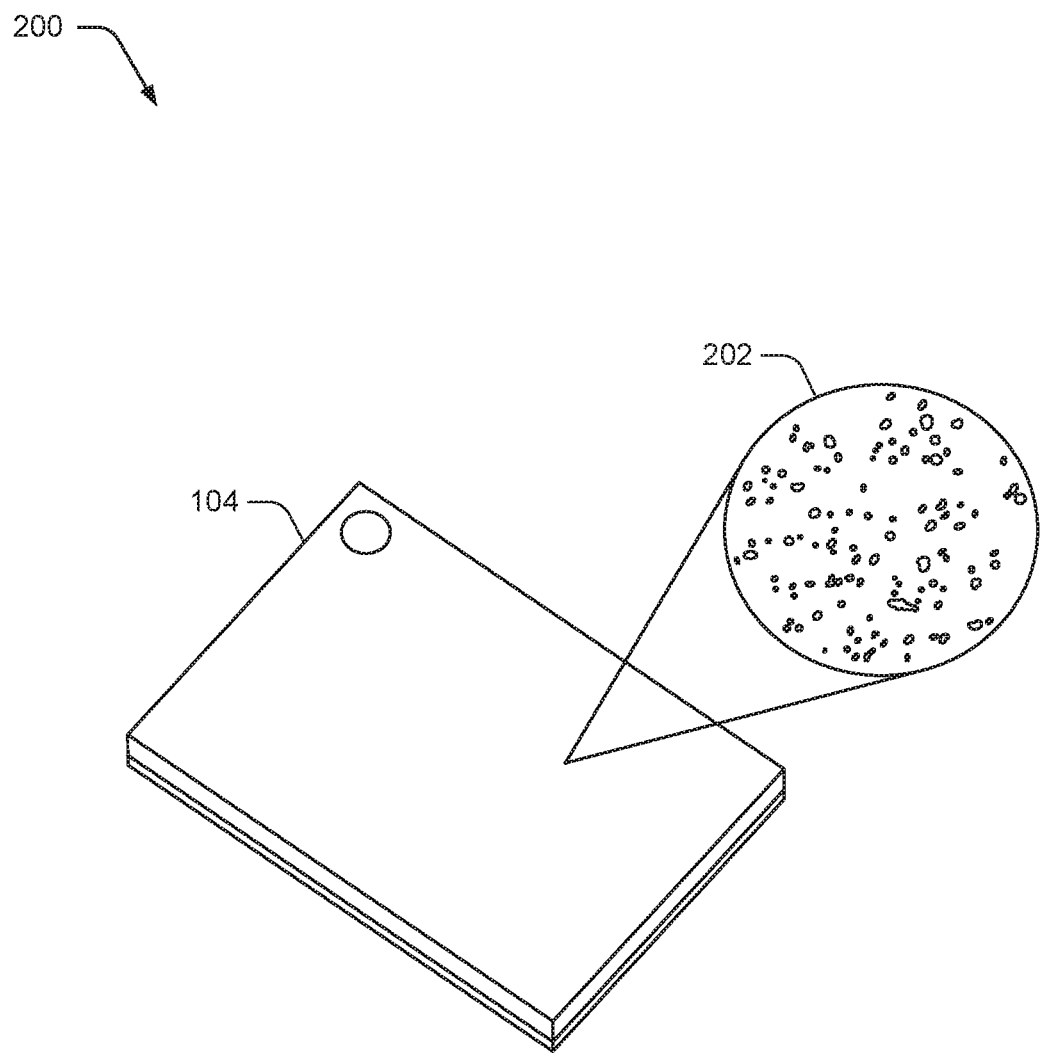
FIG. 2 illustrates an example morphology region fabricated as part of a semiconductor component and for use as a physical identifier.

FIG. 2 illustrates an example morphology region 202 fabricated as part of a semiconductor component 104 and for use as a physical identifier. As part of the encapsulation process performed by the molding system 102 in the operating environment 100, the morphology region 202 of the surface of the semiconductor component 104 is naturally formed and, within bounds defined by the mold tooling 108, indiscriminate in terms of location or size of features that reside within the surface of the semiconductor component. The morphology region 202 is sufficiently indiscriminate to limit the odds of physical identifiers (e.g., morphology regions) of two different semiconductor components matching when mapped via available mechanisms. For example, the odds of maps of morphology regions of two different semiconductor components matching may extremely high, on an order of millions to one.

After encapsulation, a high-resolution tool measures locations and sizes of features of the morphology region 202 and creates and records two-dimensional (2D) or three-dimensional (3D) maps of the morphology region 202 of the semiconductor component 104. Such a tool may be a high-resolution camera, optical or otherwise, or an interferometer. The 2D or 3D map representing the morphology region 202 is then stored for authentication purposes.

Figure 3:
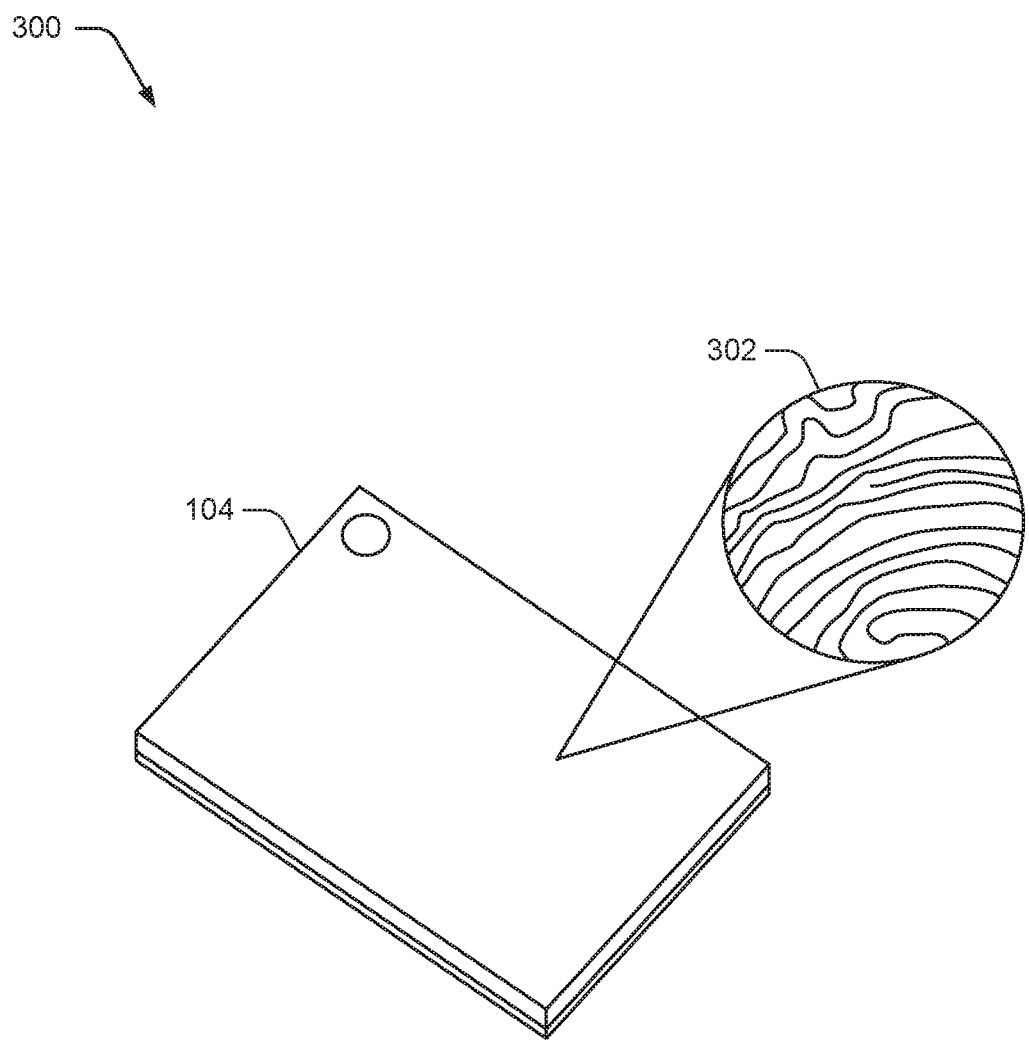
FIG. 3 illustrates an example microridge region fabricated as part of a semiconductor component and for use as a physical identifier.

FIG. 3 illustrates an example microridge region 302 fabricated as part of a semiconductor component 104 and for use as a physical identifier. For example, and as part of the encapsulation process performed in the operating environment 100, material properties of the mold compound used by the molding system 102 to encapsulate the semiconductor component 104 may be modified such that a microridge region 302 is formed during encapsulation of the IC die. Modifications to the material properties of the mold compound may include, for example, changing chemical composition of the mold compound effective to change viscosity of the mold compound during transfer and/or curing. Thermal profiles of the curing process, as performed by the molding system 102, may be also modified such that the microridge region 302 is further impacted. The microridge region 302 within the surface of the semiconductor component 104 is formed using bounds defined by the mold tooling 108 and is, by intention, indiscriminate in terms of location or size of microridge features, but is not indiscriminate as to its presence. The microridge region 302 is, by intention, sufficiently indiscriminate to limit the odds of physical identifiers (e.g., microridge regions) for two different semiconductor components matching when mapped via available mechanisms.

After encapsulation, a pressure-sensing mechanism or high-resolution tool measures the microridge region 302 and creates and records two-dimensional (2D) or three-dimensional (3D) maps of the microridge region 302. Such a pressure-sensing mechanism or high-resolution tool may be a pressure-indicating sensor film, a high-resolution camera, or an interferometer. The 2D map or 3D map representing the microridge region 302 is then stored for authentication purposes.

Figure 4:
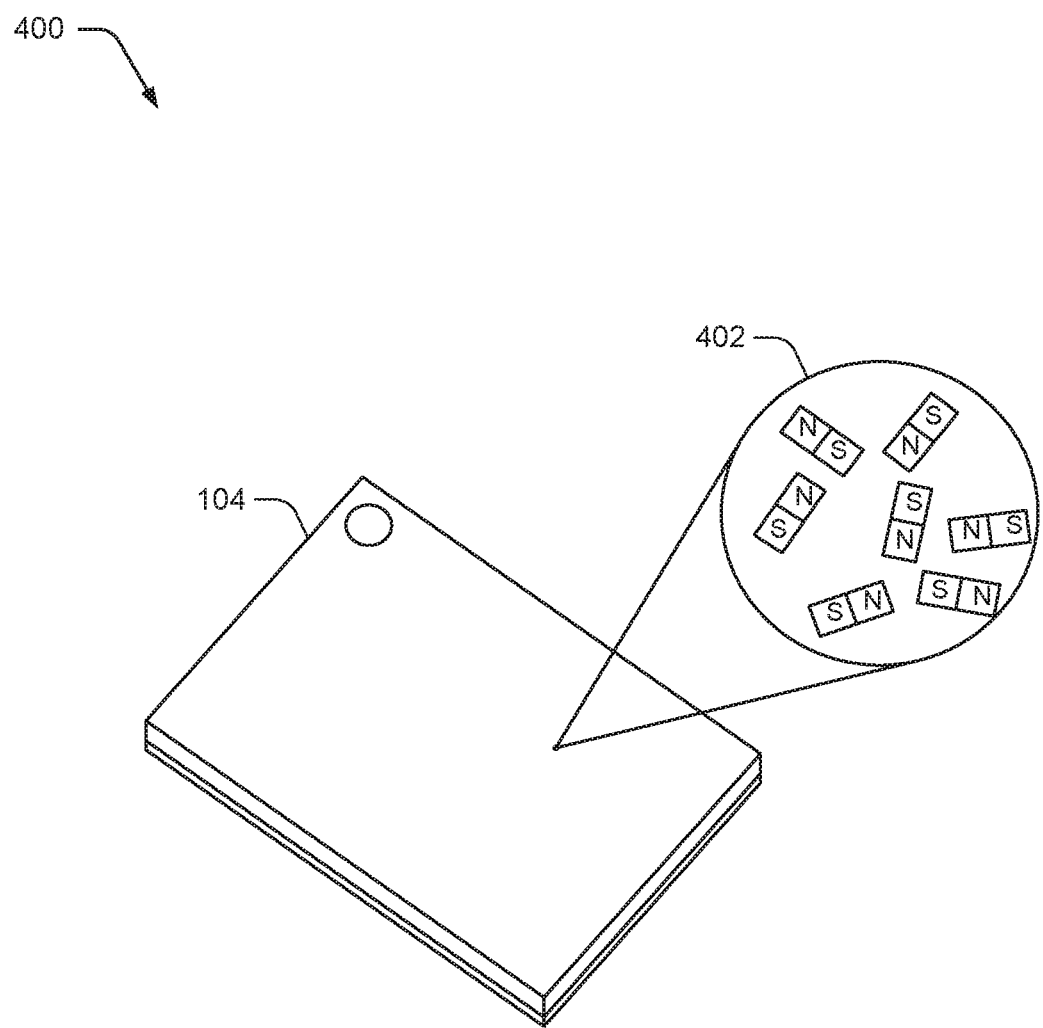
FIG. 4 illustrates an example magnetic field region fabricated as part of a semiconductor component and for use as a physical identifier.

FIG. 4 illustrates an example magnetic field region 402 fabricated as part of a semiconductor component 104 and for use as a physical identifier. As part of the encapsulation process performed in the operating environment 100, the mold compound used to encapsulate the semiconductor component 104 may be doped with a plurality of magnetic nanoparticles. The magnetic field region 402 within the surface of the semiconductor component 104 is defined by the plurality of magnetic nanoparticle locations which are, by intention, sufficiently indiscriminate to limit the odds of physical identifiers (e.g., magnetic field regions) for two different semiconductor components matching.

After encapsulation, a magnetometer reads the magnetic field region 402, creating and recording a two-dimensional (2D) map representing the magnetic field region 402. Such a magnetometer may include an induction mechanism, a rotating coil mechanism, a Hall-effect mechanism, or a fluxgate mechanism. The 2D map representing the magnetic field region 402 is then stored for authentication purposes.

Figure 5:
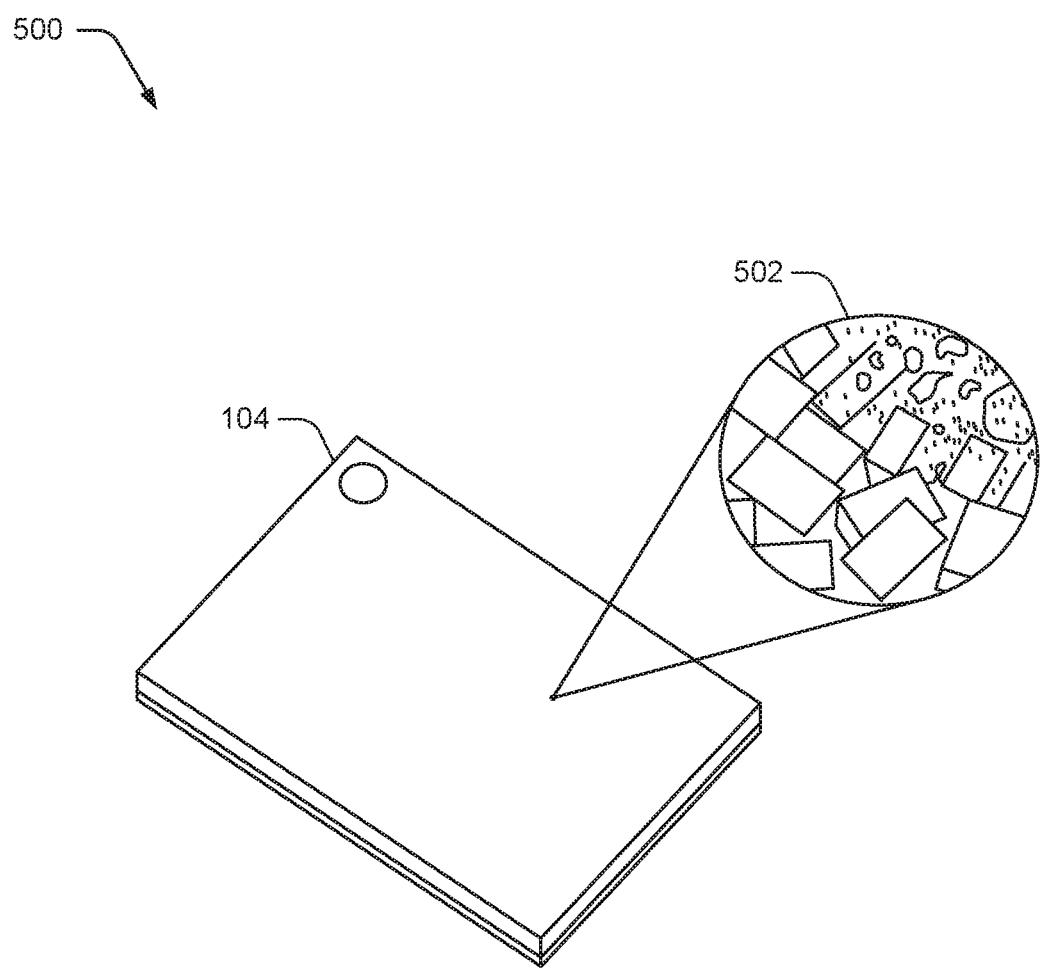
FIG. 5 illustrates an example optically-reflective region fabricated as part of a semiconductor component and for use as a physical identifier.

FIG. 5 illustrates an example optically-reflective region 502 of a semiconductor component 104 and for use as a physical identifier. As part of the encapsulation process performed in the operating environment 100, the mold compound used by the molding system 102 to encapsulate the semiconductor component 104 may be doped with a plurality of quantum dots or, alternatively, a plurality of optical nanoparticles. The optically-reflective region 502 within the surface of the semiconductor component 104 is defined by the plurality of quantum dot or plurality of optical nanoparticle locations that are, by intention, sufficiently indiscriminate to limit the odds of physical identifiers (e.g., optically-reflective regions) for two different semiconductor components matching. For example, the odds of maps of optically-reflective field regions of two different semiconductor components matching may be 1/1000, 1/10,000 or 1/10,000,000, any of which may be determined sufficient for authentication purposes.

After encapsulation, a light source paired with an optical detector measures the optically-reflective region 502, creating and recording a two-dimensional (2D) optical map representing the optically-reflective region 502. The light source may be one or more light emitting diodes (LED) and the optical detector may include a photocell, a photodiode, a phototransistor, a photovoltaic cell, or a light-dependent resistor. The light source and the optical detector are arranged in a repeatable configuration such that light emitted from the light source reflects from the optically-reflective region to generate a field of repeatable optical measurements, or a two-dimensional (2D) optical map, that is read by the optical detector. The 2D optical map representing the optically-reflective region 502 is then used stored for authentication purposes.

Figure 6:
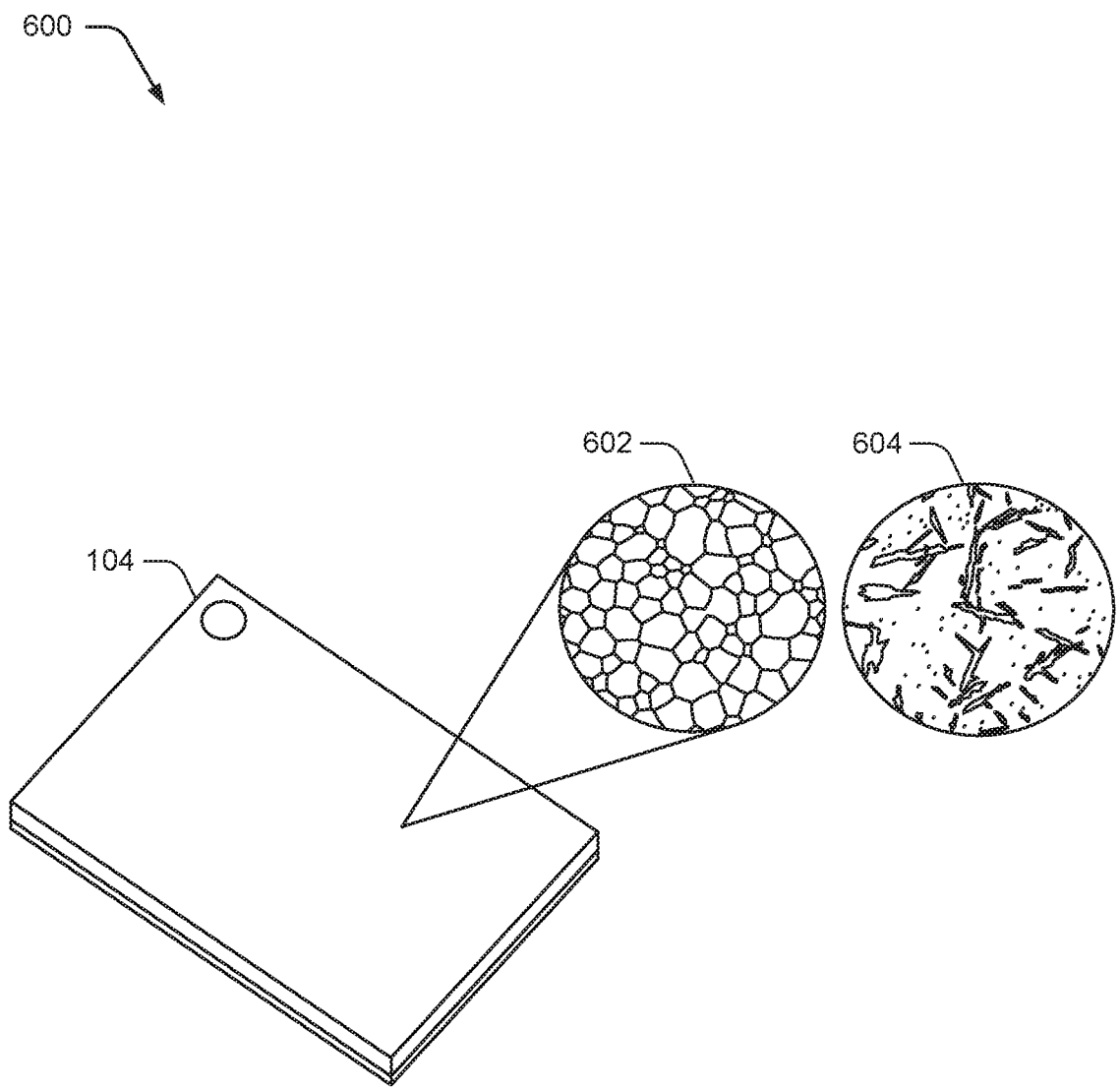
FIG. 6 illustrates example patterned-paint regions applied to a semiconductor component and for use as a physical identifier.

FIG. 6 illustrates example patterned-paint regions 602 and 604, either of which is applied to a semiconductor component 104, for use as a physical identifier. The application of patterned-paint region 602 or 604 may occur within the operating environment 100, either via paint applied by the molding system 102 (modified by those skilled in the art to incorporate a painting mechanism to apply paint) or as a paint applied by a separate system dedicated to painting the semiconductor component 104. Detectable pattern features (e.g., cracks from the paint drying as illustrated by 602 or impurities in the paint as illustrated in 604) are, by intention, sufficiently indiscriminate to limit the odds of physical identifiers (e.g., patterned-paint regions) for two different semiconductor components matching when mapped via an available detection mechanism. Furthermore, this indiscriminate nature of the patterned-paint regions is distinct from other surface markings, which might be applied in association with a predetermined value or meaning (e.g. a barcode, a semiconductor part number, a scribe, or the like).

After encapsulation, a tool measures sizes and locations of detectable pattern features of either example patterned-paint region 602 or 604, creating and recording a two-dimensional (2D) map. Such a tool may be a high-resolution camera, optical or otherwise, or an interferometer. The 2D map is then used stored for authentication purposes.

Figure 7:
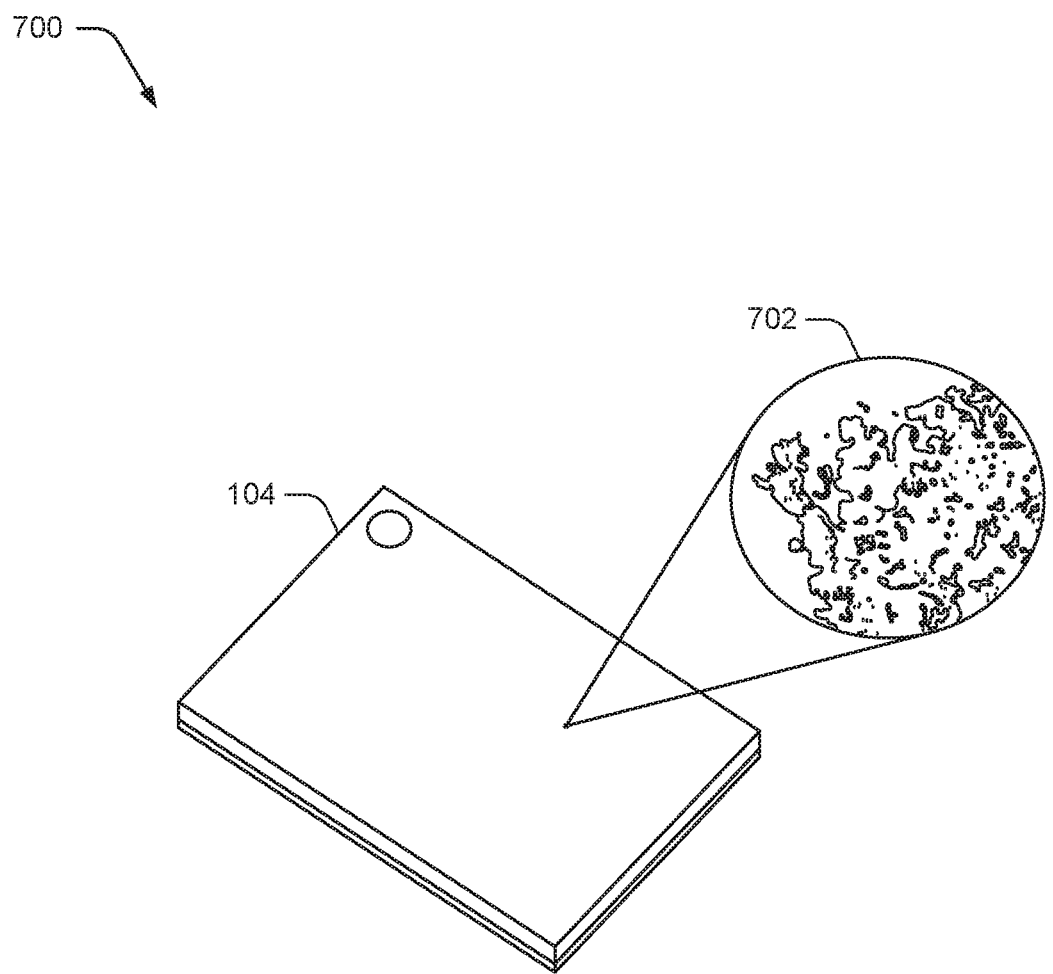
FIG. 7 illustrates another example morphology region surface region fabricated as part of semiconductor component and for use as a physical identifier.

FIG. 7 illustrates another example morphology region 702 of a semiconductor component 104 and for use as a physical identifier. The fabricating of the example morphology region 702 region may occur within the operating environment 100, either via an etching process performed by the molding system 102 (modified by those skilled in the art to incorporate an etching mechanism to perform the etching process) or by a separate system dedicated to etching the semiconductor component 104. Fabricating the morphology region 702 may be a result of an etching process, directed to chemical etching or laser ablation, which changes morphology of the region. The morphology is, by intention, sufficiently indiscriminate to limit the odds of physical identifiers (e.g., morpohology regions) for two different semiconductor components matching when mapped via an available detection mechanism.

After encapsulation, a three-dimensional (3D) hologram of the morphology region 702, representing a map of the morphology region, is created and recorded. Systems including a laser, a splitter, a camera, or a lens may create and record the hologram as a 3D map of morphology region 702. The 3D map representing the morphology region 702 is then stored for authentication purposes.

Figure 8:
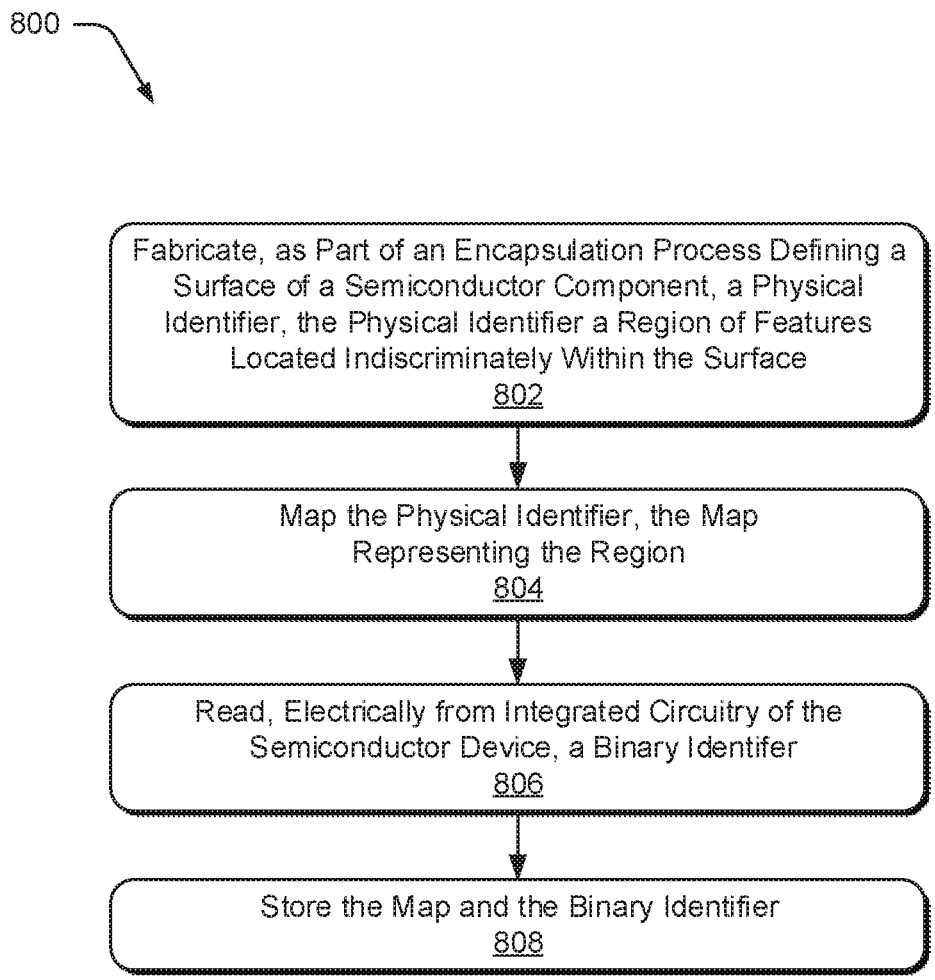
FIG. 8 illustrates an example method for enabling authenticating an identity of a semiconductor component.

FIG. 8 illustrates an example method 800 for enabling authentication of an identity of a semiconductor component, such as the semiconductor component 104 of FIG. 1. The method 800 may be performed by a manufacturer of the semiconductor component wishing to enable authentication of the identity of semiconductor component based on an original makeup of the semiconductor component.

At 802, a physical identifier is fabricated as part of an encapsulation process defining a surface of a semiconductor component 104, the physical identifier a region of features located indiscriminately within the surface. Features located indiscriminately within the surface of the semiconductor component 104 may be fabricated using a molding system, such as the molding system 102 of FIG. 1 and fabricated in accordance with one or more aspects of FIGS. 2-5.

For example, fabricating the physical identifier may fabricate a region having features located indiscriminately within the surface in the form of a plurality of microridges, such as the microridges 302 of FIG. 3. Fabricating the physical identifier may fabricate, alternatively, a physical identifier in the form of a magnetic field region, such as the magnetic field region 402 of FIG. 4, or an optically-reflective region, such as the optically-reflective region 502 of FIG. 5.

Additional examples, which may or may not be fabricated using the molding system 102 of FIG. 1, include physical identifiers fabricated in accordance with one or more aspects of FIGS. 6 and 7. For example, fabricating physical identifier may include applying paint to the surface, forming a patterned-paint region such as patterned-paint region 602 or patterned-paint region 604 of FIG. 6, or etching the surface to form a morphology region, such as the morphology region 702 of FIG. 7.

At 804, the physical identifier is mapped, where the map represents features of the region. In the instance where a region of microridges is serving as the physical identifier, a mechanism or tool, such as a pressure-indicating sensor film, a high-resolution camera, or an interferometer, may create and record a two-dimensional (2D) or three-dimensional (3D) map representing microridges of the region. In the instance where a magnetic field region is serving as the physical identifier, a magnetometer relying on an induction mechanism, a rotating coil mechanism, a Hall-effect mechanism, or a fluxgate mechanism may create and record a two-dimensional (2D) map representing a magnetic field of the region. In the instance where an optically-reflective region is serving as the physical identifier, a light source paired with an optical detector measures the optically-reflective region to create and record a two-dimensional optical map representing optical reflections of the region. The light source may be one or more light emitting diodes (LEDs) and the optical detector may include a photocell, a photodiode, a phototransistor, a photovoltaic cell, or a light-dependent resistor.

Continuing with 804, in the instance where a paint has been applied to form a patterned-paint region that serves as the physical identifier, one or more high-resolution cameras measures sizes and locations of detectable pattern features such as cracks or impurities to create and record a 2D map representing the cracks or impurities of the pattern-painted region. In the instance where the surface has been etched to create a morphology region, a system including a laser, a splitter, a camera, or a lens may create and record a hologram representing a 3D map of the morphology region.

At 806, a binary identifier is electrically read from integrated circuitry of the semiconductor component. The binary identifier may be read from volatile or non-volatile memory cells of integrated circuitry of the semiconductor component, and may be read using, for example, automated test equipment (ATE).

At 808, the map and the binary identifier are stored. For example, a secure network may transmit the map of the physical identifier and the binary identifier to a storage mechanism that is either local to, or remote from, a location where the map and the binary identifier are respectively mapped and read. This includes a storage server local to a manufacturer that assembles the semiconductor component (for example, an Outsourced Assembly and Test facility (OSAT)), a storage server of another manufacturer that incorporates the semiconductor component into a system (for example a manufacture of a printed circuit board assembly using the semiconductor component for an automated teller machine (ATM)), a storage server of an identity-authentication service, or the like. Additionally, the map of the physical identifier, the binary identifier, or both the map of the physical identifier and the binary identifier may be encrypted prior to storing.

As part of storing the map of the physical identifier and the binary identifier, the map of the physical identifier and the binary identifier are associated to each other, for example, via a lookup table. It is important to note that, as part of storing the map of the physical identifier, the map of the physical identifier may be converted to digital data (similar to digital data comprising the binary identifier read electrically from the integrated circuitry of the semiconductor component).

Figure 9:
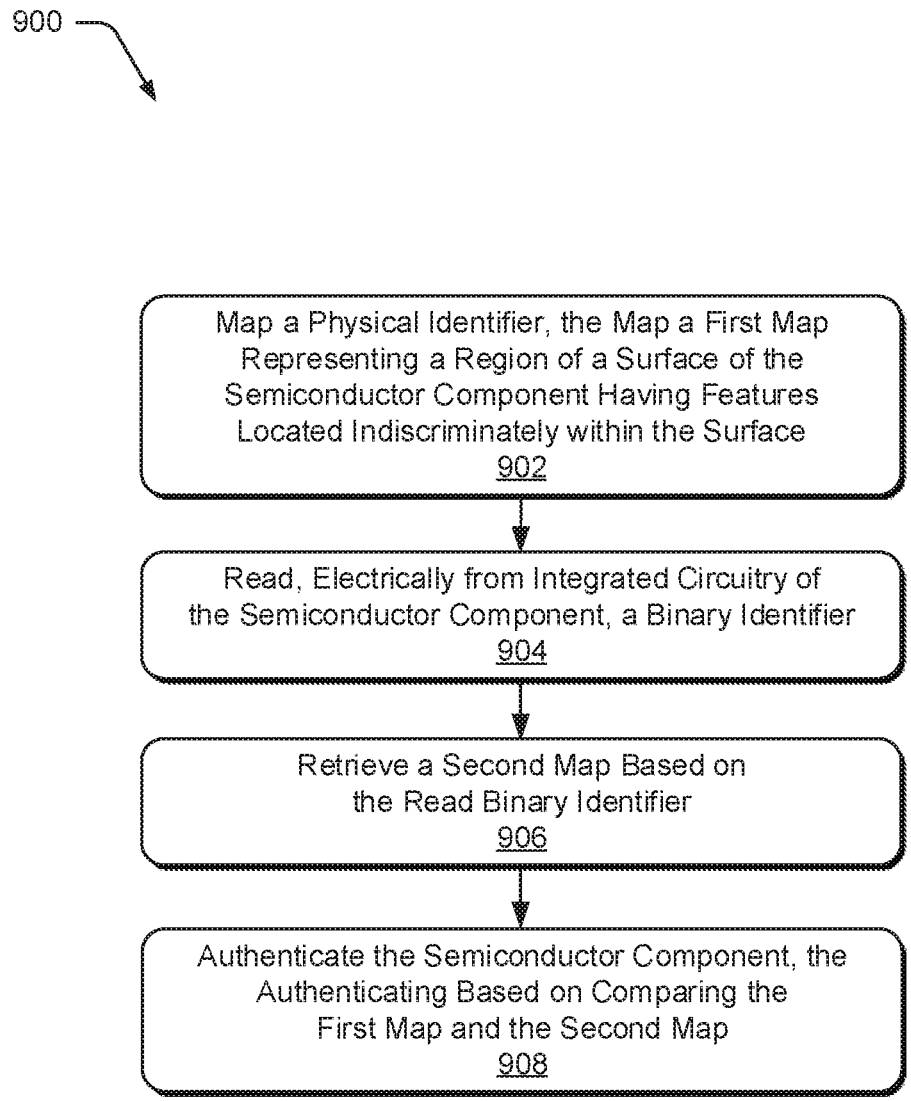
FIG. 9 illustrates an example method for authenticating an identity of a semiconductor component.

FIG. 9 illustrates an example method 900 for authenticating an identity of a semiconductor component. The method 900 is performed by an entity wishing to authenticate the identity of the semiconductor component. The semiconductor component may be the semiconductor component 104 of FIG. 1.

At 902, a physical identifier of a semiconductor component is mapped, creating a first map representing a region of a surface of the semiconductor component having features located indiscriminately within the surface.

In one instance, the first map may represent a microridge region, such as the microridge region 302 of FIG. 3. One or more mechanisms or tools, such as a pressure-indicating sensor film, a high-resolution camera, or an interferometer, may create and record a two-dimensional (2D) or three-dimensional (3D) map representing the microridge region.

In another instance, the first map may represent a magnetic field region, such as the magnetic field region 402 of FIG. 4. A magnetometer relying on an induction mechanism, a rotating coil mechanism, a Hall-effect mechanism, or a fluxgate mechanism may create and record a two-dimensional (2D) map representing the magnetic field region.

In another instance, the first map may represent an optically-reflective region, such as the optically-reflective region 502 of FIG. 5. A light source paired with an optical detector create and record a two-dimensional optical map representing the optically-reflective region. The light source may be one or more light emitting diodes (LEDs) and the optical detector may include a photocell, a photodiodes, phototransistor, a photovoltaic cell, or a light-dependent resistor.

Continuing with 902, and in an instance where a physical identifier in the form of a patterned-paint region is being mapped, one or more high-resolution cameras measures sizes and locations of detectable pattern features such as cracks or impurities to create and record a 2D map representing the patterned-paint region.

In the instance where a morphology region a physical identifier in the form of a morphology region is being mapped, a system including a laser, a splitter, a camera, or a lens may create and record a hologram as a 3D map representing the morphology region. In an instance where a physical identifier in the form of a morphology region, formed naturally as part of the encapsulation process, is being mapped, a tool such as a high-resolution camera, optical or otherwise, or an interferometer create and record a 2D or 3D map representing the morphology region.

At 904, a binary identifier is electrically read from integrated circuitry of the semiconductor component. The binary identifier may be read from volatile or non-volatile memory cells of integrated circuitry of the semiconductor component, and may be read, for example, via automated test equipment (ATE) or via another semiconductor component that may be part of an end-use system, such as a microprocessor, a trusted platform modules (TPM) incorporated into a System-on-Chip (SoC) or Multi-Chip Package (MCP), or the like.

At 906, a second map is retrieved based on the read binary identifier. For example, as part of a retrieval process, the binary identifier (read at 904) may be transmitted to a storage server of an Outsourced Assembly and Test facility (OSAT) that manufactures the semiconductor component, a storage server of another manufacturer that incorporates the semiconductor component into a system (for example a manufacture of a printed circuit board assembly using the semiconductor component for an automated teller machine (ATM)), a storage server of an identity-authentication service, or the like. Based on a lookup table (stored on a server or other storage mechanism), the binary identifier can be associated to the second map (which may or may not be encrypted digital data). The second map is then transmitted to, and retrieved by, the entity wishing to authenticate the identity of the semiconductor component.

At 908, the semiconductor component is authenticated. The authenticating is based on a comparison the first map and the second map. The comparison of the first map and the second map may comprise comparing, using comparison algorithms, either the first and second map in their entireties or corresponding portions of the first and second map. Such a comparison is dependent on the form of data comprising the maps, and may, for example, entail comparing pixel-based images for shading or intensity, comparing measured magnetic flux values, comparing measured optical intensities, or comparing measured feature locations and sizes. Any comparison algorithm may include a "go/no-go" matching threshold that is set to a high confidence interval, such as 99.9% or higher. In the event the second map was retrieved in encrypted form, decrypting of the second map may also be performed as part of 908. Furthermore, under certain conditions, the second map may partially replicate only a portion of the first map, yet still be valid for authentication purposes.

In instances where method 900 is performed as part of a system's end-use, and not as part of the system's manufacture, a semiconductor component may be exposed (as part of the system's construct) for mapping and enabling authentication. For example, consider a smart phone that exposes, through a window in its skin (or casing), a portion of a surface of an SoC semiconductor component that manages security of the smart phone (in this example, the SoC may be a Trusted Platform Module, or TPM). As a user makes a purchase using a wireless payment application, a mechanism communicating with the smart phone and performing a financial transaction can, if equipped with the appropriate mapping tool (such as a high-resolution camera or a magnetometer), authenticate the SoC semiconductor component using method 900.

Additional aspects of authenticating a semiconductor component can rely on a map of the physical identifier being associated with a scribe or marking on the surface of the semiconductor component (as opposed to a binary identifier that is electrically stored). The scribe or marking may be in the form of a barcode, a textual identifier, or the like.

Security assurance needs in certain instances may also be relaxed to a point where the physical identifier may be able to be used, by itself and with no authentication via a scribe, marking, binary identifier, or other identification mechanism, to identify the semiconductor component. Such instances may be, for example, during transport of the semiconductor component across a border where tariffing information is needed (e.g., country of manufacture), inventorying purposes at a warehouse, or the like.

Types of Semiconductor Components with a Physical Identifier

A semiconductor component in accordance with one or more aspects, such as semiconductor component 104 of FIG. 1, includes one or more integrated circuit (IC) die with integrated circuitry that may be provided in accordance with descriptions herein. The semiconductor component can be implemented in any suitable device that engages in an operation requiring a level of security assurance, such as a smart phone, tablet computer, wireless router, network-attached storage, smart appliance, printer, set-top box, or any other suitable device or system. The integrated circuitry may include memory cells that are volatile in nature (for example SDRAM, DDR, DDR2, DDR3, DDR4, SRAM, or PSRAM cells) or memory cells that are non-volatile in nature (for example NOR, FLASH, PROM, EPROM, EEPROM, FRAM, MRAM, or NVRAM cells). The memory cells can be used to store a binary identifier of the semiconductor component. The integrated circuitry may also include logic circuitry (e.g., microprocessors), light-emitting diode circuitry (e.g., LED), radio-frequency transmitting/receiving circuitry (RF), or the like.

The semiconductor component may contain a single IC die of common circuitry, a single IC die containing different circuitries (e.g., a System-on-Chip, or SoC), or multiple IC die, effective to render the semiconductor component a Multi-Chip Package (MCP) or System-in-Package (SIP).

The semiconductor component is encapsulated using a packaging technology that results, for example, in a through-hole package, a surface-mount package, a chip-carrier, a pin-grid array, a flat package, a small-outline package, a chip-scale package, or a ball-grid array package. Encapsulation may be achieved using a mold compound that consists of one or more of epoxy resins, phenolic hardeners, silicas, catalysts, pigments, or mold release agents. Furthermore, the mold compound may, in some instances, be doped with magnetic nanoparticles, quantum dots, or optical nanoparticles.

In general, methods of creating a semiconductor component with a physical identifier include techniques performed when encapsulating an IC die. However, alternate methods of creating a semicondcutor component with a physical identifier may include techniques performed after encapsulating an IC die, including painting, etching, or stamping the semiconductor component.

What is claimed is:

1. A method for enabling authentication of an identity of a semiconductor component, the method comprising:
    fabricating, at a surface of the semiconductor component, a physical identifier, the physical identifier a region of features that are located indiscriminately at the surface of the semiconductor component;
    mapping the physical identifier, the map representing the region;
    encrypting the map as first digital data;
    reading, electrically from integrated circuitry of the semiconductor component, a binary identifier;
    encrypting the binary identifier as second digital data; and
    storing the map encrypted as the first digital data and the binary identifier encrypted as the second digital data to enable authentication of the identity of the semiconductor component.

2. The method of claim 1, wherein fabricating the region having features located indiscriminately within the surface fabricates a microridge region, the microridge region comprising a plurality of microridges located indiscriminately within the surface of the semiconductor component.

3. The method of claim 2, wherein mapping the physical identifier includes measuring the microridge region via a pressure-indicating sensor film, a high-resolution camera, or an interferometer.

4. The method of claim 1, wherein fabricating the region having features located indiscriminately with the surface fabricates a magnetic field region, the magnetic field region comprising a plurality of magnetic nanoparticles located indiscriminately within the surface of the semiconductor component.

5. The method of claim 4, wherein mapping the physical identifier includes reading the magnetic field region via an induction mechanism, a rotating coil mechanism, a Hall-effect mechanism, or a fluxgate mechanism.

6. The method of claim 1, wherein fabricating the region having features located indiscriminately with the surface fabricates an optically-reflective region, the optically-reflective region comprising a plurality of quantum dots or a plurality of optical nanoparticles located indiscriminately within the surface of the semiconductor component.

7. The method of claim 6, wherein mapping the physical identifier includes measuring the optically-reflective region via a light source paired with an optical detector, the light source a light-emitting diode and the optical detector one or more of a photocell, a photodiode, a phototransistor, a photovoltaic cell, or a light-dependent resistor.

8. The method of claim 4, wherein fabricating the region includes fabricating the physical identifier by doping a mold compound that encapsulates the semiconductor component with the plurality of magnetic nanoparticles.

9. The method of claim 6, wherein fabricating the region includes fabricating the physical identifier by doping a mold compound that encapsulates the semiconductor component with the plurality of quantum dots or the plurality of optical nanoparticles.

10. A method for authenticating an identity of a semiconductor component, the method comprising:
    molding, into a surface of the semiconductor component, a physical identifier, the physical identifier a region of features that are located indiscriminately within the surface of the semiconductor component;
mapping the physical identifier, the map a first map;
reading, electrically from integrated circuitry of the semiconductor component, a binary identifier;
retrieving a second map based on the read binary identifier; and
authenticating the identity of the semiconductor component, the authenticating based on comparing the first map and the second map.

11. The method of claim 10, wherein mapping the physical identifier includes measuring a microridge region, the microridge region comprising a plurality of microridges located indiscriminately within the surface, via a pressure-indicating sensor film, a high-resolution camera, or an interferometer.

12. The method of claim 10, wherein mapping the physical identifier includes reading a magnetic field region, the magnetic field region comprising a plurality of magnetic nanoparticles located indiscriminately within the surface, via an induction mechanism, a rotating coil mechanism, a Hall-effect mechanism, or a fluxgate mechanism.

13. The method of claim 10, wherein mapping the physical identifier includes measuring an optically-reflective region, the optically-reflective region comprising a plurality of quantum dots or a plurality of optical nanoparticles located indiscriminately within the surface, via a light source paired with an optical detector, the light source a light-emitting diode and the optical detector one or more of a photocell, a photodiode, a phototransistor, a photovoltaic cell, or a light-dependent resistor.

14. The method of claim 10, wherein retrieving the second map retrieves the second map from an identity-authentication service.

15. The method of claim 10, wherein comparing the first map and the second map includes using a comparison algorithm to compare the first map and second map, in their entireties, or corresponding portions of the first map and the second map.

16. A semiconductor component comprising:
a physical identifier having a region of features, the features located indiscriminately within a surface of the semiconductor component, molded by an encapsulation process into the surface of the semiconductor component, and capable of being mapped to a first map; and
a binary identifier stored within integrated circuitry of the semiconductor component, the binary identifier capable of being electrically read and used to retrieve a second map to compare to the first map and authenticate an identity of the semiconductor component.

17. The semiconductor component of claim 16, wherein the region is a microridge region, the microridge region comprising a plurality of microridge features located indiscriminately within the surface.

18. The semiconductor component of claim 16, wherein the region is a magnetic field region, the magnetic field region comprising a plurality of magnetic nanoparticle features located indiscriminately within the surface.

19. The semiconductor component of claim 16, wherein the region is an optically-reflective region, the optically-reflective region comprising a plurality of quantum dots or a plurality of optical nanoparticle features located indiscriminately within the surface.

20. The semiconductor component of claim 16, wherein the binary identifier stored within integrated circuitry of the semiconductor component is stored within volatile or non-volatile memory cells of the semiconductor component.

* * * * *